United States Patent
Zhang et al.

(10) Patent No.: US 12,313,443 B2
(45) Date of Patent: May 27, 2025

(54) METHOD OF WEIGHING USING OBJECT RECOGNITION AND DEVICE THEREFOR

(71) Applicants: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

(72) Inventors: Song Zhang, Changzhou (CN); Kan Liu, Changzhou (CN); Shenhui Wang, Changzhou (CN); Zhiqiang Wang, Changzhou (CN); Kai Yin, Changzhou (CN)

(73) Assignees: Mettler-Toledo (Changzhou) Measurement Technology Ltd., Changzhou (CN); Mettler-Toledo (Changzhou) Precision Instruments Ltd., Changzhou (CN); Mettler-Toledo International Trading (Shanghai) Co., Ltd., Shanghai (CN)

( * ) Notice: Subject to any disclaimer, the term of this patent is extended or adjusted under 35 U.S.C. 154(b) by 353 days.

(21) Appl. No.: 17/631,196

(22) PCT Filed: Jul. 29, 2020

(86) PCT No.: PCT/CN2020/105367
§ 371 (c)(1),
(2) Date: Jan. 28, 2022

(87) PCT Pub. No.: WO2021/018162
PCT Pub. Date: Feb. 4, 2021

(65) Prior Publication Data
US 2022/0260410 A1     Aug. 18, 2022

(30) Foreign Application Priority Data
Jul. 31, 2019   (CN) ................. 201910699873.9

(51) Int. Cl.
*G01G 19/414*     (2006.01)
*G01G 21/22*      (2006.01)
(Continued)

(52) U.S. Cl.
CPC ....... *G01G 19/4144* (2013.01); *G01G 19/414* (2013.01); *G01G 21/22* (2013.01);
(Continued)

(58) Field of Classification Search
CPC .... G01G 19/4144; G01G 21/22; G01G 19/62; G01G 19/414; G01N 5/00; G01N 21/84;
(Continued)

(56) References Cited

U.S. PATENT DOCUMENTS

| | | | |
|---|---|---|---|
| 2010/0092035 A1 | 4/2010 | Murdter | |
| 2019/0072427 A1* | 3/2019 | Okamura | G07G 1/0072 |

(Continued)

FOREIGN PATENT DOCUMENTS

| | | |
|---|---|---|
| CN | 104296852 A | 1/2015 |
| CN | 205981415 U | 2/2017 |

(Continued)

*Primary Examiner* — Lisa M Caputo
*Assistant Examiner* — Cynthia L Davis
(74) *Attorney, Agent, or Firm* — Standley Law Group LLP; Jeffrey S. Standley; Adam J. Smith (57) ABSTRACT

A method of weighing using a scale (10) comprises the steps of: recognizing at least one of a plurality of objects placed within an object recognition area (A) of a platform (20) of the scale (10), and weighing the plurality of objects placed on the platform (20) of the scale (10) to determine a total weight of the plurality of objects. A weighing device (10) comprises the platform (20) configured as a plane, and (Continued)

utilizes the aforementioned weighing method. The method of weighing is advantageous in that it reduces the difficulty of object recognition using an algorithm by increasing the degree to which the object on the weighing platform fits the algorithm, reduces the complexity of the operation flow and the time required, and effectively increases the precision and accuracy of object recognition.

15 Claims, 3 Drawing Sheets

(51) Int. Cl.
*G06V 10/22* (2022.01)
*G06V 10/70* (2022.01)
*G06V 20/50* (2022.01)
*G06V 20/52* (2022.01)

(52) U.S. Cl.
CPC .............. *G06V 10/22* (2022.01); *G06V 10/70* (2022.01); *G06V 20/50* (2022.01); *G06V 20/52* (2022.01)

(58) Field of Classification Search
CPC ........ G06V 10/22; G06V 10/70; G06V 20/50; G06V 20/52; G06V 20/10; G06F 18/2413; G06F 18/241; G01B 11/00

See application file for complete search history.

(56) References Cited

U.S. PATENT DOCUMENTS

| | | | | |
|---|---|---|---|---|
| 2020/0202137 A1* | 6/2020 | Li | ........................... | G06V 20/64 |
| 2020/0240829 A1* | 7/2020 | Zhang | .................... | G06V 20/52 |

FOREIGN PATENT DOCUMENTS

| | | | |
|---|---|---|---|
| CN | 106618291 | A | 5/2017 |
| CN | 107084780 | A | 8/2017 |
| CN | 206565858 | U | 10/2017 |
| CN | 108303170 | A | 7/2018 |
| CN | 108663105 | A | 10/2018 |
| CN | 109118200 | A | 1/2019 |
| CN | 110009839 | A | 7/2019 |
| CN | 110044454 | A | 7/2019 |
| KR | 10-2019-0020206 | A | 2/2019 |

\* cited by examiner

METHOD OF WEIGHING USING OBJECT RECOGNITION AND DEVICE THEREFOR

BACKGROUND OF THE INVENTION

Technical Field

The present invention relates to a weighing device and a method of weighing that involves performing object recognition.

Background Art

In the field of weighing, applications such as object counting, check weighing and formulation have a broad market. However, the complexity of applications imposes higher requirements on weighing techniques. For example, in the formulation or order application, the weighing techniques cannot directly recognize the object category, such that the next operation can be performed only after an object barcode is read by means of an apparatus such as an external scanning gun or by way of manually entering the type characteristics of the article. Moreover, for the formulation or order with a large variety of articles, the process becomes more complicated and the operation efficiency is relatively low.

As image recognition techniques expand rapidly, the use of object recognition in the area of weighing opens new opportunities especially in applications such as object counting, check weighing, and formulation. For example, with the aid of image recognition techniques, the article on a weighing platform top can be directly recognized, and the weight of the article is then weighed and approved by means of the weighing application, so that the external input entry is avoided, and the efficiency is greatly improved.

The imaging effect of the objects in the image and the background algorithm directly determine the precision and accuracy of object recognition. However, in the actual weighing application site, it is possible to encounter situations that are more complicated. For example, when the objects to be recognized on the weighing platform top are adhered together or a stacking phenomenon occurs, it will bring a big challenge to the recognition algorithm. In addition, in order to achieve an accurate recognition result, it is necessary to consider the final imaging of the object in different postures and at different positions in the field of view during modelling of the object, so that the modelling process is relatively complicated, and the training requirements for the operator are higher, while the time spent also increases significantly.

SUMMARY

The technical problem to be solved by the present invention is overcoming low precision and low accuracy of the prior art image recognition systems when applied to a weighing apparatus. A new and improved weighing device with an object recognition function and a method of weighing are provided, in which the degree to which the image fits the algorithm is balanced, which effectively increases the precision and accuracy of object recognition.

The present invention solves the above technical problem by using a method of weighing using a scale. The method comprising recognizing at least one of a plurality of objects placed within the object recognition area of the platform of the scale and weighing the plurality of objects placed on the platform of the scale to determine a total weight of the plurality of objects.

In the present invention, an object recognition area is provided on the platform, so that when the plurality of objects is to be recognized, the user only needs to intentionally place the at least one of the objects in this area, to facilitate object recognition. Whereas in the prior art, recognition is performed on the objects placed on the entire platform, and the user needs to place and arrange the objects optimally on the platform to ensure that the objects are recognized. Compared with the prior art, the present invention provides the object recognition area, which makes it easier for the user to operate and achieve a higher success in recognizing the object accurately. Moreover, the influence of factors such as object sticking, stacking phenomenon or ambient light source and shadow on object identification and recognition is also avoided when the objects are placed in the object recognition area of the platform. In turn, the complexity of the algorithm used for recognition is reduced, while effectively increasing the precision and accuracy of object recognition. At the same time, the method of performing image recognition is simplified, made faster and efficient, in comparison to the conventional methods that use a scanning gun.

In the present invention, by recognizing at least one of the plurality of objects, it is possible to determine or match information related to the plurality of objects loaded on the platform, such as item type, article number, size, and weight.

In the present invention, at least one of the plurality of objects to be detected may be recognized before or after weighing the plurality of objects, or may also be recognized as alongside weighing the plurality of objects.

Preferably, the weighing method further comprising outputting the weight of the at least one of the plurality of objects along with the recognized information of the at least one of the plurality of objects. Alternatively, inputting the weight of the at least one of the plurality of objects along with the recognized information of the at least one of the plurality of objects into an order or a database. In an alternative manner, counting at least one of the plurality of objects by means of the weight of the object and outputting the counted number.

In the present invention, the information about the object such as the recognized object type, number of articles and the total weight of the objects obtained after weighing are transmitted externally for further use, in particular, inputting into order information or a corresponding database to provide quick and efficient input for subsequent order management, etc.

Preferably, recognizing the at least one of the plurality of objects placed within the object recognition area of the platform comprises: taking a picture of the platform, or taking a picture of the object recognition area of the platform; and recognizing the at least one of the plurality of objects in the object recognition area of the platform from the picture taken in the previous step.

The present invention realizes the visual recognition of the object recognition area in the picture of the entire scale platform top, and can directly utilize and modify the existing visual recognition apparatus to implement the weighing method of the present invention.

In the present invention, it is also possible to directly install a visual recognition apparatus corresponding to an object recognition area, thereby reducing the requirements for apparatus installation.

Preferably, the weighing method further comprising weighing the at least one of the plurality of objects placed within the object recognition area.

The present invention realizes the recognition of an object by using both image information and weight information as parameters of object recognition.

In the present invention, the weight of the at least one of the plurality of objects that are placed within the object recognition area is determined, and the weight of the plurality of objects that are placed on the entire platform is then determined. Therefore, the at least one of the plurality of objects are first placed within the object recognition area for determining the weight thereof, and then the plurality of objects can be placed in the other areas on the platform and the weight thereof is detected, and the objects to be detected are then recognized by means of an image. The operations above may also be performed in a reverse sequence, and even the operations above may be performed simultaneously.

Preferably, the weighing method comprises sending the picture to a training model to recognize the at least one of the plurality of objects to be detected that is/are placed in the object recognition area.

In an alternative way, sending the picture and the weight of the at least one of the plurality of objects that are within the object recognition area to the training model to recognize the at least one of the plurality of object(s).

The present invention utilizes an existing general training model, in combination with information such as an image of the at least one of the plurality of objects to be recognized, to complete the recognition of a particular object.

Preferably, the training model recognizes the at least one of the plurality of objects in the picture by using picture feature comparison.

Alternatively, the training model recognizes the at least one of the plurality of objects in the picture by using the picture feature comparison and whether the deviation between the weight of the object and a pre-set standard weight in the model is within a pre-determined error range.

In the present invention, the existing image comparison technique is used to recognize an object by means of the degree to which the image of the object in the picture matches an image feature of the object recorded in the model. Moreover, the accuracy of object recognition is further verified by comparing the weight of the object with its standard weight.

Preferably, constructing the training model comprises: taking pictures of at least one of the plurality of objects placed within the object recognition area on the platform in different angular directions and sending the pictures of the at least one of the plurality of objects to a recognition algorithm and constructing the training model.

In the present invention, the object recognition area may also be used for taking pictures of the object in different directions, for example, taking pictures when the object is placed on the platform with different standing faces, and the model containing information such as the image of the object and the present posture is obtained. Since the object recognition area is a specially selected area on the platform, the influence of external factors such as ambient conditions is significantly reduced, and the construction of model is simpler and more convenient.

Preferably, one or more of weight information of the at least one of the plurality of objects, light source information, and shadow information are acquired during or before or after taking the pictures of the object. The acquired information and the pictures taken are sent to the recognition algorithm for constructing the training model.

The present invention further improves the training model by means of incorporating the ambient information and weight information of the object, thereby increasing the accuracy of recognition.

The present invention also provides a weighing device comprising a platform configured as a plane, wherein the weighing device utilizes the weighing method described above.

Preferably, the platform comprises an object recognition area that is configured as a protrusion or a marking line along a boundary of the object recognition area. The object recognition area can also be configured as a raised portion that is higher than remaining portions of the platform, or as recessed portions separating the object recognition area from the remaining portions of the platform.

In the present invention, it is convenient for the user to operate and use the scale by separating the object recognition area from the other areas of the platform.

Preferably, the object recognition area is located at a corner of the platform or at a centre of the platform.

The present invention further improves the convenience of operation and use by arranging the object recognition area at a position such as a corner or at a centre position of the platform.

In a preferred embodiment, the platform is of a rectangular or square configuration. Advantageously, the object recognition area is configured in the form of a rectangle, square, or circle.

The positive and progressive effects of the present invention are that the present invention reduces the complexity of algorithm recognition by increasing the degree to which the object on the weighing platform fits the algorithm, reduces the complexity of the operation flow and the run time, and effectively increases the precision and accuracy of the object recognition.

DETAILED DESCRIPTION OF EMBODIMENTS

The present invention is further illustrated below by way of embodiments, but is not thus limited within the scope of these embodiments.

A platform 20 of a weighing apparatus or a scale 10 of the present invention is divided to have an independent image area or object recognition area A where an object placed within an object recognition area A is recognized, and a plurality of objects on the entire platform 20 are then weighed. The weighing data and the object recognition results may also be used for counting the number of objects, etc., on the platform 20. In addition, the processing of formulation or order information can be realized by combining article information related to the object.

The present invention will be described in detail with reference to the foregoing embodiments.

Figure 1:
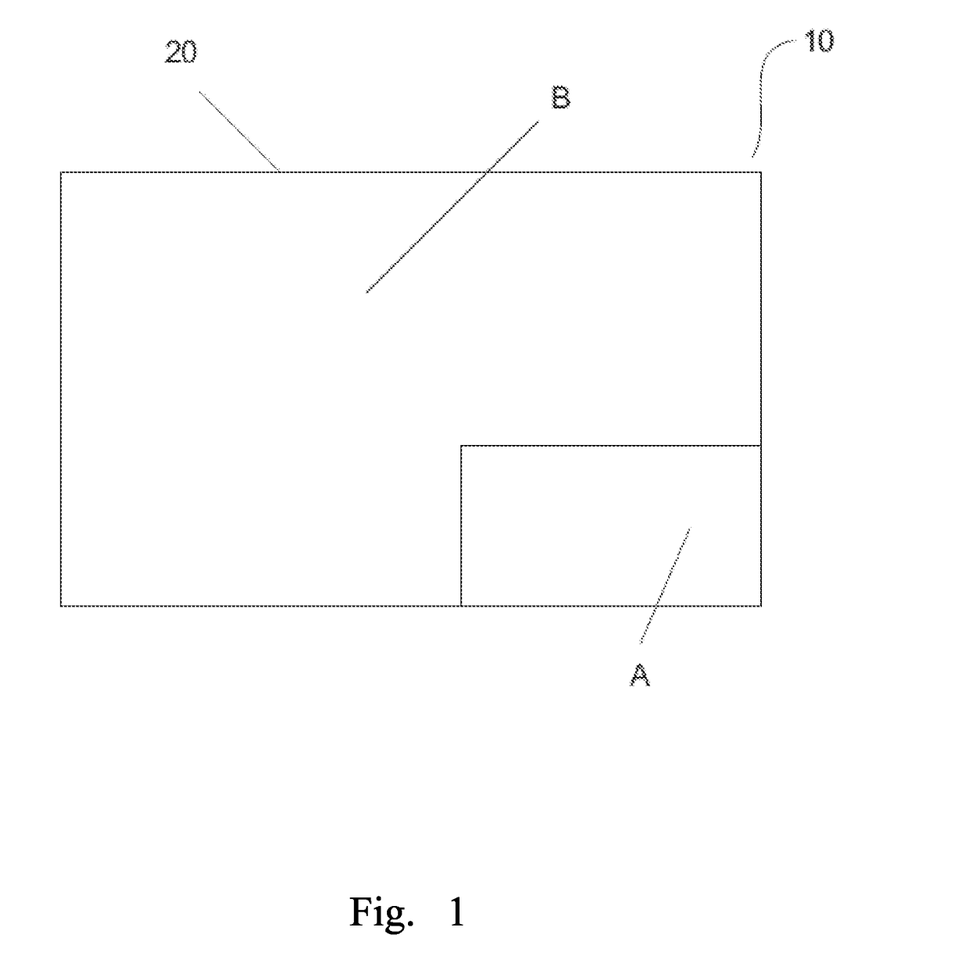
FIG. 1 is a schematic view of a platform of a scale according to an embodiment of the present invention.

An object recognition area A on a platform 20 of a scale 10 of the embodiment as shown in FIG. 1 is arranged at one corner of the platform 20. The field of view of a camera on the scale 10 covers the entire platform 20, and in this embodiment, only an object placed in the object recognition area A provided on the platform 20 is visually recognized.

Figure 2:
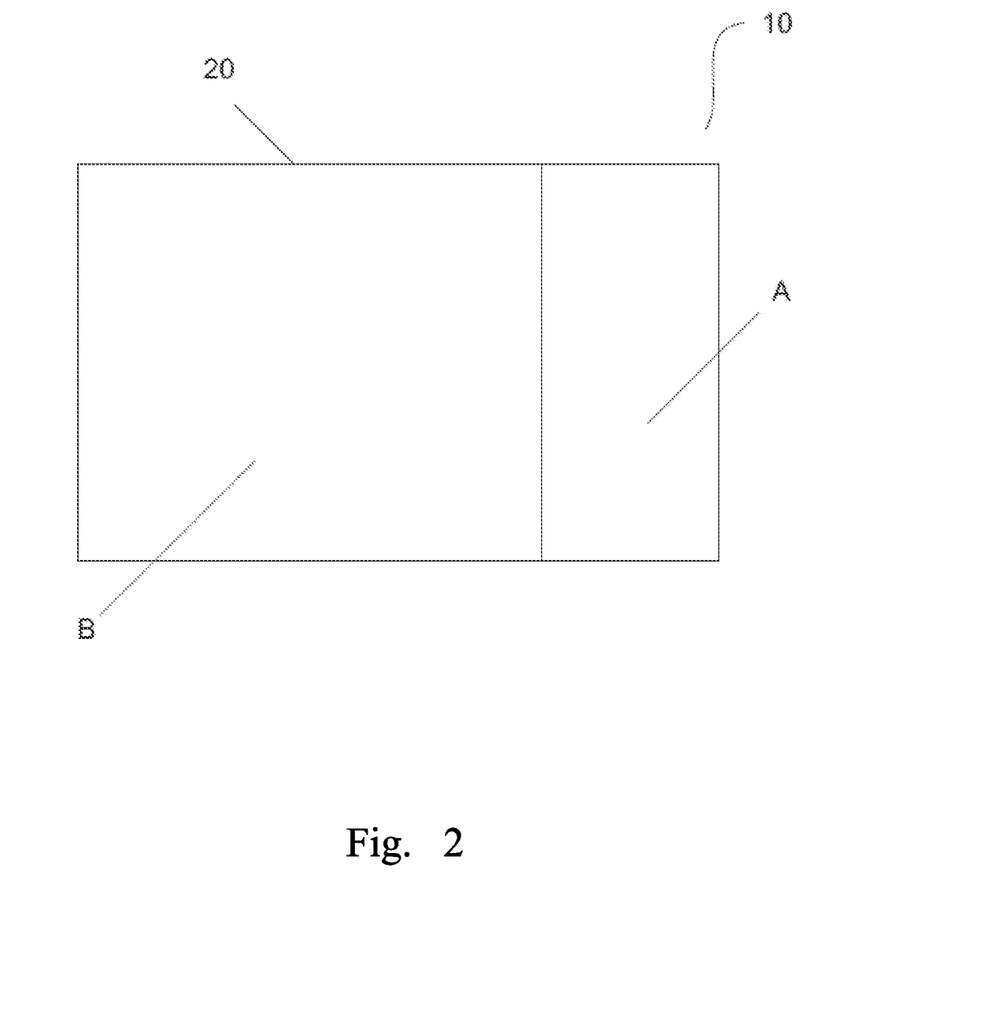
FIG. 2 is a schematic view of a platform of a scale according to a further embodiment of the present invention.

In another embodiment, the object recognition area A is arranged on any one of the other three corners or on one side as shown in FIG. 2 or on any of the other three sides.

Figure 3:
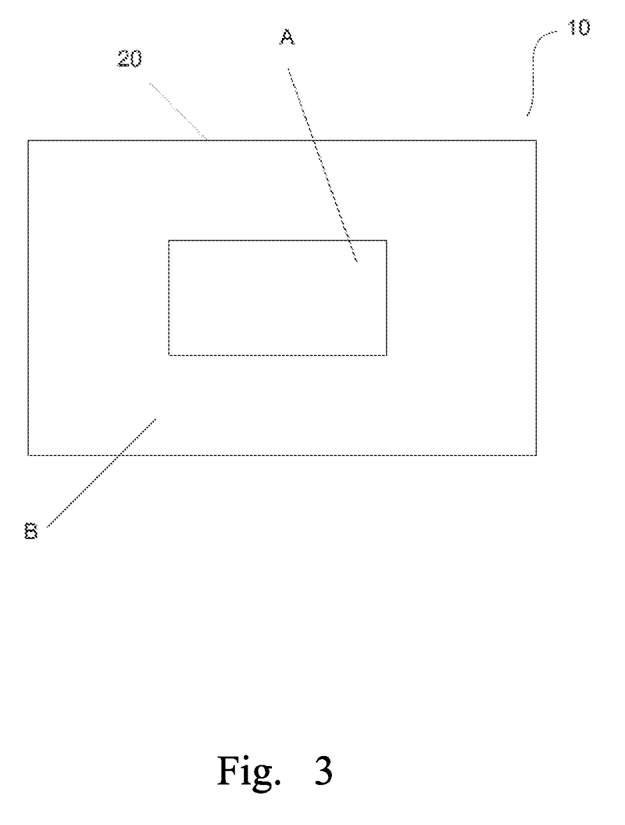
FIG. 3 is a schematic view of a platform of a scale according to a still further embodiment of the present invention.

Further, in an alternative example shown in FIG. 3, the object recognition area A may be arranged on the central area of the platform 20. The object recognition area A may be arranged at any position on the platform 20 in addition to the positions of the area A provided in the above embodiments.

The platform 20 of the scale 10 of this embodiment is configured as a plane as shown in FIG. 1. In another embodiment, the area A is configured as a raised portion along the edge outline on the platform 20, which physically separates the area A from the platform 20 to facilitate the placement of the object.

In yet another embodiment, the portion of the area A on the platform 20 is integrally raised relative to the other portions of the platform 20 to form a platform area that is higher than the other portions of the platform 20. In a different example, the other portions of the platform 20 are recessed relative to the area A, forming a recessed area lower than the area A.

Apart from the rectangular shaped platform 20 as shown in FIG. 1, in another embodiment, the platform 20 has a profiled shape such as a circular or elliptical shape, and the way in which the area A is arranged may also use the arrangement and placement that is so far described through various embodiments or examples above.

In yet another embodiment, the field of view of the camera on the platform 20 only covers the object recognition area A and visually recognizes the object placed within the confines of area A, thereby reducing the influence of ambient conditions necessary for the visual recognition apparatus and image acquisition. At the same time, it is also convenient for installing and debugging.

When performing object recognition, one object may be placed within the area A, or multiple objects such as three or six objects may also be placed within the area A provided on the platform 20. The camera takes a picture of the entire platform 20 or only the area A, and the weight weight_a of the object(s) located within the area A is computed and the weight data is saved.

The background algorithm recognizes the object(s) placed within the area A on the platform 20 by means of the picture, extracts an image feature and compares same with a previously stored training model to establish a relationship, gives an object matching confidence, and then compares the weight information weight_a with weight information weight_a_s recorded in the model within a pre-determined weight tolerance. The confidence and the weight tolerance are combined with the object recognition result to make a comprehensive determination.

Since only the object within the area A is recognized, the algorithm reduces the complexity of feature extraction and comparison. In addition, if the picture in the training model is also obtained from the same area A, since the actual imaging effect within the area A is relatively similar to the picture in the model, the algorithm further reduces the difficulty of feature extraction and comparison, and can obtain better recognition results. At the same time, the determination method considering the weight further increases the accuracy.

Then, an unlimited number of objects can be placed or dumped on the other area B of the platform 20. In this embodiment, the object recognition is performed only on area A, so that there is no requirement for imaging the objects located in area B, as is the case in prior art arrangements. This arrangement allows the operator to use the scale 10 and weigh various types of objects quickly and conveniently.

Thereafter, a picture of the entire platform 20 is taken; the weight of objects weight_ab on the entire platform 20 is weighed, and the picture along with the weight data weight_a and weight_ab are sent to the background algorithm for processing.

In the embodiment in which the field of view of the camera only covers the area A, at this time, only the weight weight_ab on the entire platform 20 is determined, and the weight data weight_a and weight_ab is fed as inputs to the background algorithm for processing.

When the background algorithm determines that the object within the area A on the platform 20 is the desired object, the object information and the weight information weight_ab is directly given as output or is recorded. It is also possible to send the weight data weight_ab on the entire platform 20 to an order to record the total weight of the objects in the order, and to calculate the number of the objects of this type by the relationship between the total weight and the piece weight, and the quantity information is also sent to the order for storage. After the processing is completed, the scale 10 proceeds to the processing of the next type of objects.

In another embodiment, when performing object recognition, a at least one of a plurality of objects is/are placed within the area A of the platform 20, then the weight weight_a of the object(s) within the area A is determined and the weight data is saved. A plurality of objects are then placed or dumped on the other area B of the platform 20. Thereafter, a picture of the entire platform 20 is taken; weight weight_ab of the platform 20 is determined, and the picture along with the weight data weight_a and weight_ab are sent to the background algorithm for processing.

The background algorithm preferentially recognizes the object placed in an image of a specified picture that corresponds to the portion of the area A on the platform 20, and in the background the algorithm determines whether the object within the area A of the platform 20 is the desired object. Then the object information and the weight information weight_ab are subjected to subsequent processing, for example, the weight data weight_ab on the entire platform 20 is sent to an order.

In still another embodiment, a plurality of objects are directly dumped on to the platform 20, while a limited number of objects (such as one, five, or eight objects) are removed from area B and placed within the area A.

A picture of the entire platform 20 or only the area A is then taken. The weight weight_ab of the entire platform 20 is determined. The picture along with the weight data weight_ab is sent to the background algorithm for processing.

The background algorithm uses the picture to recognize the object(s) placed within the area A on the platform 20 or directly recognize the object(s) in the picture of area A, extracts image features and compares them with a previously stored training model to establish a relationship, gives the object matching confidence, and then gives the object recognition result.

Once the background algorithm determines that the object within the area A of the platform 20 is the desired object, the object information and the weight information weight_ab are subjected to subsequent processing, for example, the weight data weight_ab on the entire platform 20 is sent to an order.

In order to reduce the complexity of feature extraction and comparison by the algorithm, in another embodiment, the training model is also established by utilizing the area A on the platform 20. For creating the model, initially, a limited number of objects, for example one object, or seven or twelve objects, is/are placed within the area A on the platform 20 in a specified posture(s) and position (s), e.g., for a part with three standing faces, only one standing face may be selected, a part is placed in the centre of the area A, with its orientation being perpendicular to the position of the area A, a picture is then taken. The picture thus taken is sent to the recognition algorithm for training the model, and finally the model is created, which contains information such as the object image and the presented posture.

In another embodiment, while a picture of the object is taken, the object is also weighed simultaneously, and the weight information weight_a_s of the object is obtained and sent to the recognition algorithm for model training.

In still another embodiment, the ambient information such as the light source and the shadow during the entire process of taking the picture, before or after taking the picture of the object is also sent to the recognition algorithm for model training.

Although the specific implementations of the present invention are described above, a person skilled in the art should understand that these are only exemplary, and the scope of protection of the present invention is defined by the attached claims. A person skilled in the art can make various changes or modifications to these implementations without departing from the principle and spirit of the present invention, but all the changes or modifications fall within the scope of protection of the present invention.

REFERENCE SIGNS LIST

| | |
|---|---|
| Area A | object recognition area |
| Area B | area on the platform that is outside the object recognition area |

The invention claimed is:

1. A method of weighing using a scale, said method comprising:
    placing a plurality of objects on a weigh platform of the scale, wherein at least one of the plurality of objects is intentionally placed within an object recognition area of the weigh platform of the scale;
    recognizing the at least one of the plurality of objects placed within the object recognition area of the weigh platform of the scale
    wherein placing the plurality of objects on the weigh platform of the scale comprises further placing other objects on the weigh platform of the scale but not within the object recognition area of the scale such that no object recognition is performed on the other objects; and
    weighing the plurality of objects that are placed on the weigh platform of the scale to determine a total weight of the plurality of objects.

2. The method of claim 1, wherein the step of recognizing the at least one of the plurality of objects placed within the object recognition area of the weigh platform comprises:
    taking a picture of the weigh platform or taking a picutre of the object recognition area of the weigh platform; and
    recognizing, using the picture taken, the at least one of the plurality of objects in the object recognition area of the weigh platform.

3. The method of claim 2, wherein recognizing the at least one of the plurality of objects placed within the object recognition area of the weight platform further comprises:
    weighing the at least one of the plurality of objects placed within the object recognition area.

4. The method of claim 3, wherein recognizing the at least one of the plurality of objects comprises:
    sending the picture taken to a trained model to recognize the at least one of the plurality of objects in the object recognition area; or
    sending the picture taken and the weight of the at least one of the plurality of objects placed within the object recognition area to the training-trained model to recognize the at least one of the plurality of objects.

5. The method of claim 4, wherein:
    the trained model is configured to use picture feature comparison to recognize the at least one of the plurality of objects in the picture taken; and, optionally,
    the trained model is further configured to compare the weight of the at least one of the plurality of objects against a pre-set standard weight to determine if a weight difference is within a predetermined error range.

6. The method of claim 4, wherein constructing the trained model comprises:
    placing an object of the same type as the objects of the plurality of objects within the object recognition area of the weigh platform of the scale and taking pictures of the object in different angular directions; and
    sending the pictures of the object to a recognition algorithm for constructing the trained model.

7. The method of claim 6, wherein the recognition algorithm constructs the trained model using at least one of:
    weight information of the object, light source information, and shadow information acquired during or before or after taking the pictures of the object.

8. The method of claim 1, further comprising at least one of:
    outputting the weight of the at least one of the plurality of objects and recognized information of the at least one of the plurality of objects; or
    inputting the weight of the at least one of the plurality of object-objects and the recognized information of the at least one of the plurality of objects into an order or a database; or
    counting the at least one of the plurality of objects by means of the weight of the at least one of the plurality of objects and outputting a counted number.

9. A weighing device comprising a weigh platform configured as a plane, wherein the weighing device is configured to perform the method of claim 1.

10. The weighing device of claim 9, wherein the weigh platform comprises an object recognition area that is configured as a protrusion or a marking line along a boundary of the object recognition area, or as a raised portion that is higher than remaining portions of the weigh platform, or as recessed portions separating the object recognition area from the remaining portions of the weigh platform.

11. The weighing device of claim 9, wherein the object recognition area is located at a corner of the weigh platform or at a center of the weigh platform.

12. The weighing device of claim 11, wherein the weigh platform is of a rectangular or square configuration.

13. The weighing device of claim 11, wherein the object recognition area is configured in the form of a rectangle, square, or circle.

14. The method of claim 1, wherein:
- information related to the plurality of objects placed on the platform is determined by recognizing the at least one of the plurality of objects, and
- the information related to the plurality of objects and the total weight of the plurality of objects obtained after weighing are transmitted externally for further use.

15. The method of claim 1, further comprising at least one of:
- outputting the total weight of the plurality of objects and the recognized information of the at least one of the plurality of objects; or
- inputting the total weight of the plurality of objects and the recognized information of the at least one of the plurality of objects into an order or a database; or
- counting the plurality of objects by means of the total weight of the plurality of objects and outputting a counted number.

* * * * *

UNITED STATES PATENT AND TRADEMARK OFFICE
CERTIFICATE OF CORRECTION

| | | |
|---|---|---|
| PATENT NO. | : 12,313,443 B2 | Page 1 of 1 |
| APPLICATION NO. | : 17/631196 | |
| DATED | : May 27, 2025 | |
| INVENTOR(S) | : Song Zhang et al. | |

It is certified that error appears in the above-identified patent and that said Letters Patent is hereby corrected as shown below:

In the Claims

In Column 7, Line 55, Claim 1, please delete "scale" and insert -- scale; --.

In Column 7, Line 58, Claim 1, please delete "objects on" and insert -- objects of the plurality of objects on --.

In Column 7, Line 65, Claim 2, please delete "the step of".

In Column 8, Line 19, Claim 4, please delete "training-trained" and insert -- trained --.

In Column 8, Line 48, Claim 8, please delete "object-objects" and insert -- objects --.

Signed and Sealed this
Twenty-fourth Day of June, 2025

Coke Morgan Stewart
*Acting Director of the United States Patent and Trademark Office*